(12) United States Patent
Wang et al.

(10) Patent No.: US 12,250,661 B2
(45) Date of Patent: *Mar. 11, 2025

(54) MASTER INFORMATION BLOCK EXTENSION IN A NEW RADIO CELL

(71) Applicant: Telefonaktiebolaget LM Ericsson (publ), Stockholm (SE)

(72) Inventors: Yi-Pin Eric Wang, Fremont, CA (US); Xingqin Lin, San Jose, CA (US); Yutao Sui, Solna (SE); Mohammad Mozaffari, Fremont, CA (US); Andreas Höglund, Solna (SE); Olof Liberg, Enskede (SE); Luca Feltrin, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 309 days.

This patent is subject to a terminal disclaimer.

(21) Appl. No.: 17/770,760

(22) PCT Filed: Nov. 6, 2020

(86) PCT No.: PCT/SE2020/051070
§ 371 (c)(1),
(2) Date: Apr. 21, 2022

(87) PCT Pub. No.: WO2021/091469
PCT Pub. Date: May 14, 2021

(65) Prior Publication Data
US 2022/0377705 A1 Nov. 24, 2022

Related U.S. Application Data

(60) Provisional application No. 62/932,588, filed on Nov. 8, 2019.

(51) Int. Cl.
*H04W 72/02* (2009.01)
*H04W 56/00* (2009.01)
(Continued)

(52) U.S. Cl.
CPC ......... *H04W 72/02* (2013.01); *H04W 56/001* (2013.01); *H04W 72/0446* (2013.01); *H04W 72/0453* (2013.01)

(58) Field of Classification Search
CPC .............. H04W 72/02; H04W 56/001; H04W 72/0446; H04W 72/0453; H04W 72/23;
(Continued)

(56) References Cited

U.S. PATENT DOCUMENTS

2010/0265899 A1 10/2010 Du
2012/0327895 A1 12/2012 Wallen et al.
(Continued)

FOREIGN PATENT DOCUMENTS

CN 110226354 A 9/2019
EP 3373644 A1 9/2018
(Continued)

OTHER PUBLICATIONS

European Search Report dated Nov. 15, 2023 for Application No. 20885154.3, consisting of 8 pages.
International Search Report and Written Opinion dated Apr. 12, 2021 for International Application No. PCT/SE2020/051070 filed Nov. 6, 2020, consisting of 11 pages.
(Continued)

*Primary Examiner* — Ricky Q Ngo
*Assistant Examiner* — David M Kayal
(74) *Attorney, Agent, or Firm* — Weisberg I.P. Law, P.A.

(57) ABSTRACT

There is provided a method performed by a wireless device for communicating with a network node in a wireless communication network. The method includes using a field in a Master Information Block (MIB) received by the wireless device, as an indication of a presence of an extended MIB (eMIB) and identifying which candidate resource of at least one candidate resource that contains the eMIB based on the indication of the presence of the eMIB. There is also provided a corresponding wireless device for
(Continued)

communicating with a network node, a method perform by a network node, and a network node.

18 Claims, 13 Drawing Sheets

(51) Int. Cl.
*H04W 72/0446* (2023.01)
*H04W 72/0453* (2023.01)

(58) Field of Classification Search
CPC ... H04W 48/12; H04W 72/044; H04W 72/30; H04L 27/2602; H04L 5/0048; H04L 5/0053; H04L 5/0091; H04L 5/0064; H04L 1/0061; H04L 5/0007
See application file for complete search history.

(56) References Cited

U.S. PATENT DOCUMENTS

| | | | |
|---|---|---|---|
| 2015/0103800 | A1 | 4/2015 | Seo et al. |
| 2017/0265156 | A1 | 9/2017 | Xue et al. |
| 2017/0331670 | A1 | 11/2017 | Parkvall et al. |
| 2018/0198659 | A1* | 7/2018 | Ko .................. H04L 27/2602 |
| 2018/0324796 | A1* | 11/2018 | Takahashi ............ H04W 48/12 |
| 2019/0342826 | A1* | 11/2019 | Talarico ............... H04L 5/0048 |
| 2020/0068512 | A1* | 2/2020 | Xue .................... H04L 27/2657 |
| 2020/0163052 | A1* | 5/2020 | Ko ...................... H04J 11/0079 |
| 2020/0228966 | A1* | 7/2020 | Xu ...................... H04W 56/001 |
| 2021/0289536 | A1* | 9/2021 | Liu ..................... H04W 74/0841 |

FOREIGN PATENT DOCUMENTS

| | | |
|---|---|---|
| WO | 2018039942 A1 | 3/2018 |
| WO | 2018203281 A1 | 11/2018 |
| WO | 2019059675 A1 | 3/2019 |
| WO | 2019168451 A1 | 9/2019 |
| WO | 2020190205 A1 | 9/2020 |

OTHER PUBLICATIONS

3GPP TSG-RAN WG2 Meeting #103bis R2-1813755; Title: Clarification on initial BWP in SIB1; Source: vivo; Agenda Item: 10.4.1.3.1.1; Document for: Discussion and Decision; Date and Location: Oct. 8-12, 2018, Chengdu, China; consisting of 4 pages.
3GPP TSG-RAN WG1 Meeting #103-e R1-20008072; Title: Initial access for REDCAP UEs; Agenda Item: 8.6.5; Source: Nokia, Nokia Shanghai Bell; Document for: Discussion and Decision; Date and Location: Oct. 26-Nov. 13, e-Meeting; consisting of 6 pages.
3GPP TS 38.133 V15.6.0; 3rd Generation Partnership Project; Technical Specification Group Radio Access Network; NR; Requirements for support of radio resource management (Release 15); Jun. 2019; consisting of 16 pages.
3GPP TS 38.211 V15.4.0; 3rd Generation Partnership Project; Technical Specification Group Radio Access Network; NR; Physical channels and modulation (Release 15); Dec. 2018; consisting of 96 pages.
3GPP TS 38.331 V15.4.0; 3rd Generation Partnership Project; Technical Specification Group Radio Access Network; NR; Radio Resource Control (RRC) protocol specification (Release 15); Dec. 2018; consisting of 474 pages.
3GPP TS 38.213 V15.6.0; 3rd Generation Partnership Project; Technical Specification Group Radio Access Network; NR; Physical layer procedures for control (Release 15); Jun. 2019; consisting of 107 pages.
Chinese Office Action and English Summary Translation dated Nov. 1, 2024 for Application No. 202080077384.0, consisting of 15 pages.
Y.P.E Wang, et al., A Primer on 3GPP Narrowband Internet of Things; Internet of Things; IEEE Communications Magazine; Mar. 2017, consisting of 7 pages.
3GPP TSG RAN WG1 Meeting #AH_NR2 R1-1710082; Title: Configuration and monitoring of the group-common PDCCH; Source: CATT; Agenda Item: 5.1.3.1.4.3; Document for: Discussion and Decision; Location and Date: Qingdao, P. R. China, Jun. 27-30, 2017; consisting of 5 pages.

* cited by examiner

MASTER INFORMATION BLOCK EXTENSION IN A NEW RADIO CELL

CROSS-REFERENCE TO RELATED APPLICATIONS

This application is a Submission Under 35 U.S.C. § 371 for U.S. National Stage Patent Application of International Application No.: PCT/SE2020/051070, filed Nov. 6, 2020 entitled "MASTER INFORMATION BLOCK EXTENSION IN A NEW RADIO CELL," which claims priority to U.S. Provisional Application No. 62/932,588, filed Nov. 8, 2019, the entireties of both of which are incorporated herein by reference.

TECHNICAL FIELD

The present disclosure relates to wireless communications, and in particular, to methods and devices for extending Master Information Block (MIB) content for bandwidth limited wireless devices such as reduced capability New Radio (NR) Wireless Devices (WDs).

BACKGROUND

System information in the 3rd Generation Partnership Project (3GPP) New Radio (NR) is delivered through a Master Information Block (MIB) and System Information Blocks (SIBs). The MIB is transmitted on a physical channel separate from the SIBs such as a physical broadcast channel (PBCH). The MIB contains a small amount of information, necessary for the wireless device (WD) to be able to receive the remaining system information in the SIBs. Among other pieces of information, the MIB contains the configuration of Control Resource Set #0 (CORESET #0) and Search Space #0. CORESET #0 describes the structure for receiving the Physical Downlink Control Channel (PDCCH), while Search Space #0 defines monitoring locations of the CORESET #0 in time.

The structure of the MIB may be specified in standards such as the 3rd Generation Partnership Project (3GPP) wireless communication standards (see e.g. Section 7.4.3, TS 38.211 and Section 6.2.2, TS 38.331), and the format cannot change between releases of the standard without potentially adversely interfering with backwards compatibility.

For example, in the currently known NR specifications the smallest possible CORESET #0 size in the frequency domain is 24 resource blocks (RBs), which means that it is not possible to support bandwiths smaller than this, despite a MIB occupying 20 RBs. There may also be other enhancements desirable in the future which may benefit from changes to the MIB.

However, currently, most of the bits carried by PBCH has a specific meaning defined in the 3GPP wireless communication standards such as the 3GPP New Radio (NR) standards.

Low-cost or low-complexity User Equipment (UE) implementation is envisioned to be important for the future 5G system, e.g., for massive industrial sensor deployment or wearables. Currently, "NR-Light" is used as the running name for the discussion of such application in 3GPP.

In more detail, NR-Light is intended for use cases that do not require a device to support full-fledged NR capability and IMT-2020 performance requirements. For example, the data rate may not need to reach above 1 Gbps, and the latency may not need to be as low as 1 ms. By relaxing the data rate and latency targets, NR-Light allows low-cost or low-complexity UE implementation. The NR-Light UEs may be referred to as bandwidth-limited wireless devices or as reduced capability (RedCap) devices.

In more detail, in 3GPP Release 15, an NR UE is required to support 100 MHz carrier bandwidth in frequency range 1 (from 410 MHz to 7125 MHz) and 200 MHz carrier bandwidth in frequency range 2 (from 24.25 GHz to 52.6 GHz). For NR-Light UEs, supporting 100 MHz or 200 MHz bandwidth is superfluous. For example, a UE bandwidth of 8.64 MHz might be sufficient if the use cases do not require a data rate higher than 20 Mbps. Reduced UE bandwidth results in complexity reduction and potentially also in energy consumption reduction.

SUMMARY

It is therefore an object of the present disclosure to provide a method performed by a WD, a WD, a method performed by a network node and a network node, a wireless device for communicating with a network node in a wireless communication network, which alleviate all or at least some of the above-discussed challenges.

Further, it is an object of the present disclosure to provide methods, apparatuses, and systems for using a field of a MIB as a flag to indicate whether an "extension MIB' (eMIB) is present, and in particular for providing flexibility in allocating resources for eMIB transmissions.

Further, it is an object of the present disclosure to provide methods, apparatuses, and systems for allowing Physical Downlink Shared Channel (PDSCH) to coexist with eMIB transmissions in an improved way as compared to currently known solutions.

In accordance with an aspect of the present disclosure there is provided a method performed by a wireless device (WD) for communicating with a network node in a wireless communication network. The method comprises using a field in a Master Information Block (MIB), received by the wireless device, as an indication of a presence of an extended MIB (eMIB). The method further comprises identifying which candidate resource of at least one candidate resource that contains the eMIB based on the indication of the presence of the eMIB.

In some embodiments, the step of identifying which candidate resource of the at least one candidate resource comprises sequentially decoding on a plurality of candidate resources until the candidate resource containing the eMIB is identified, or simultaneously decoding on a plurality of candidate resources until the candidate resource containing the eMIB is identified.

Further, in accordance with some embodiments, the step of identifying which candidate resource of the at least one candidate resource comprises performing blind decoding of the eMIB on the at least one candidate resource in order to identify which candidate resource of the at least one candidate resource contains the eMIB. Blind decoding may be understood as a process of decoding a message on one or more spectrum resources "blindly", i.e. without knowing if it is the right spectrum resource(s), until the expected data or payload is found.

Still further, in accordance with some embodiments, the method further comprises decoding the eMIB in order to obtain configurations for a set of resources used by a control channel (e.g. CORESET #0) and/or Search Space #0 for a bandwidth-limited wireless device.

In accordance with another aspect of the present disclosure, there is provided a wireless device for communicating with a network node in a wireless communication network, the wireless device comprising processing circuitry configured to execute the method according to any one of the embodiments disclosed herein. With this aspect of the disclosure, similar advantages and preferred features are present as in the previously discussed first aspect of the disclosure.

In accordance with another aspect of the present disclosure, there is provided a method implemented by a network node that is configured to communicate with a wireless device in a wireless communication network. The method comprises using a field in a MIB to be transmitted to the wireless device as an indication of a presence of an eMIB. The method further comprises obtaining at least one of a frequency domain allocation and a time domain allocation for the eMIB, and transmitting the eMIB on at least one candidate resource to the wireless device in accordance with the determined frequency domain allocation and/or the determined time domain allocation.

In accordance with another aspect of the present disclosure, there is provided a network node configured to communicate with a wireless device in a wireless communication network, the network node comprising processing circuitry configured to execute the method according to any one of the embodiments disclosed herein.

At least some embodiments of the present disclosure provide advantages in terms of added flexibility in allocating resources for eMIB transmissions. Furthermore, at least some embodiments allows for PDSCH to coexist with eMIB transmissions in an improved manner as compared to other currently known solutions.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Figure 1:
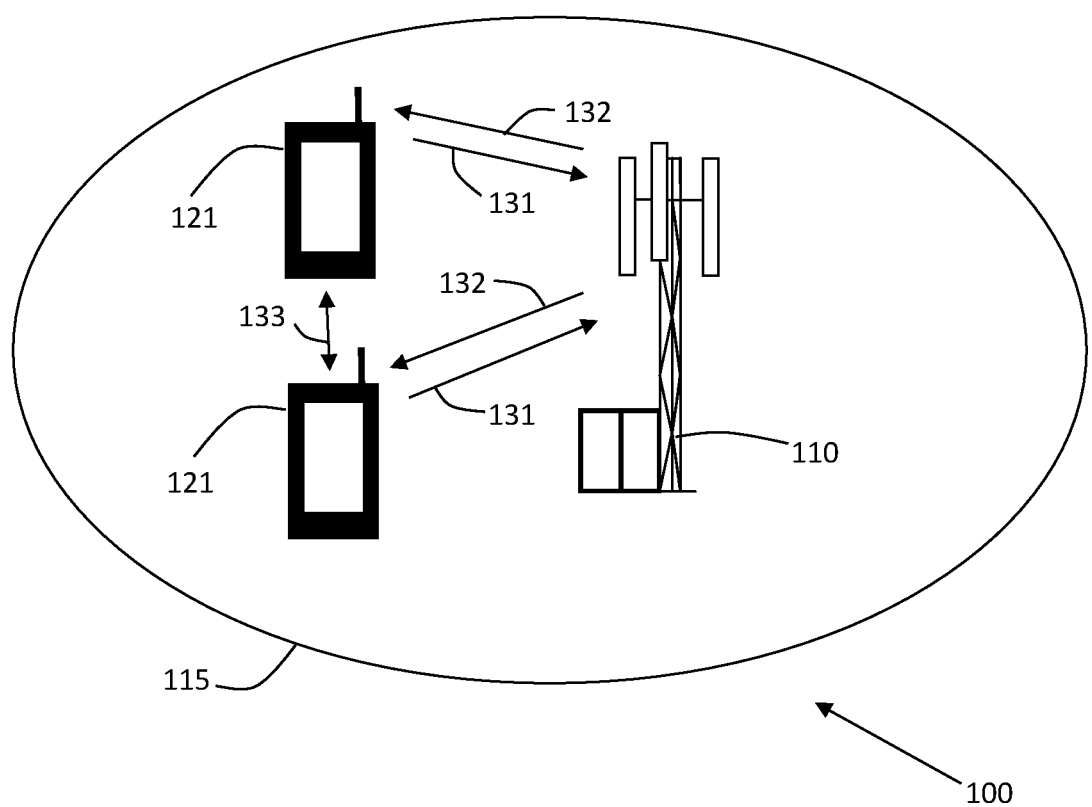
FIG. 1 is a schematic illustration of a network node and a wireless device in a wireless communications network.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., data (which may also be and/or comprise configuration data) and/or scheduling data and/or scheduling grants. Configuring a terminal may include sending allocation/configuration data to the terminal indicating how to interpret the MIB. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

FIG. 1 depicts a wireless communications network 100 in which embodiments herein may operate. In some embodiments, the wireless communications network 100 may be a radio communications network, such as, 5G or NR network. Although, the wireless communications network 100 is exemplified herein as an 5G or NR network, the wireless communications network 100 may also employ technology of any one of LTE, LTE-Advanced, WCDMA, GSM/EDGE, WiMax, UMB, GSM, or any other similar network or system. The wireless communications network 100 may also employ technology of an Ultra Dense Network, UDN, which e.g. may transmit on millimetre-waves (mmW).

The wireless communications network 100 comprises a network node 110. The network node 110 may serve wireless devices in at least one cell 115, or coverage area. The network node 110 may correspond to any type of network node or radio network node capable of communicating with a wireless device and/or with another network node, such as, a base station (BS), a radio base station, gNB, eNB, eNodeB, a Home NodeB, a Home eNodeB, a femto Base Station (BS), or a pico BS in the wireless communications network 100. Further examples of the network node 110 may be a repeater, multi-standard radio (MSR) radio node such as MSR BS, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), or core network node.

In FIG. 1, two wireless devices 121 are located within the cell 115. The wireless devices 121 are configured to communicate within the wireless communications network 100 via the network node 110 over a radio link served by the network node 110. Utilizing the radio link, a bi-directional communications flow may be set up between the wireless devices 121 and any entity capable of communication via the wireless communications network 100. The wireless devices 121 may transmit data over an air or radio interface to the radio base station 110 in uplink, UL, transmissions 131 and the radio base station may transmit data over an air or radio interface to the wireless devices 121 in downlink, DL, transmissions 132. The wireless devices 121 may refer to any type of wireless devices (WDs) or User Equipments (UEs) communicating with a network node and/or with another wireless device in a cellular, mobile or radio communication network or system.

Before describing in detail exemplary embodiments, it is noted that some embodiments reside primarily in combinations of apparatus components and processing steps related to using the reserved bit of a MIB as a flag to indicate whether an eMIB is present. In particular, in some existing wireless communication standards, except for one or more reserved bits, all of the bits on the PBCH have a specific meaning defined in the wireless communication standards, where these one or more reserved bits have not yet been defined, i.e., may lack any associated function and/or functionality defined the existing wireless communication standards. For example, a reserved bit under existing wireless communication standards may refer to a bit that is reserved for future use. In 3GPP Technical Specification (TS) 38.331 V15.4.0, a reserved bit is referred to as a "spare" bit where this spare bit may not have any defined functionality within the MIB other than being spare, as shown below:

value. Thus, such UEs/WDs (may also be referred to as "Legacy UEs") will behave according to current specifications. For a Rel-17 UE however, the reserved bit may be used to indicate a presence (or absence) of an eMIB (may also be referred to as a "MIB extension"). For example a "0" value of the reserved bit indicates that there is no eMIB to be expected, and a "1" indicates that there is an eMIB present. Thus, according to some embodiments, the reserved bit is a single spare bit in the MIB.

Further, the method 200 comprises identifying 202 which candidate resource of one or more candidate resources that contains the eMIB based on the indication of the presence of the eMIB. In other words, when the presence of eMIB is indicated in the MIB, the UE/WD attempts to detect an eMIB on one or more candidate resources.

Figure 6:
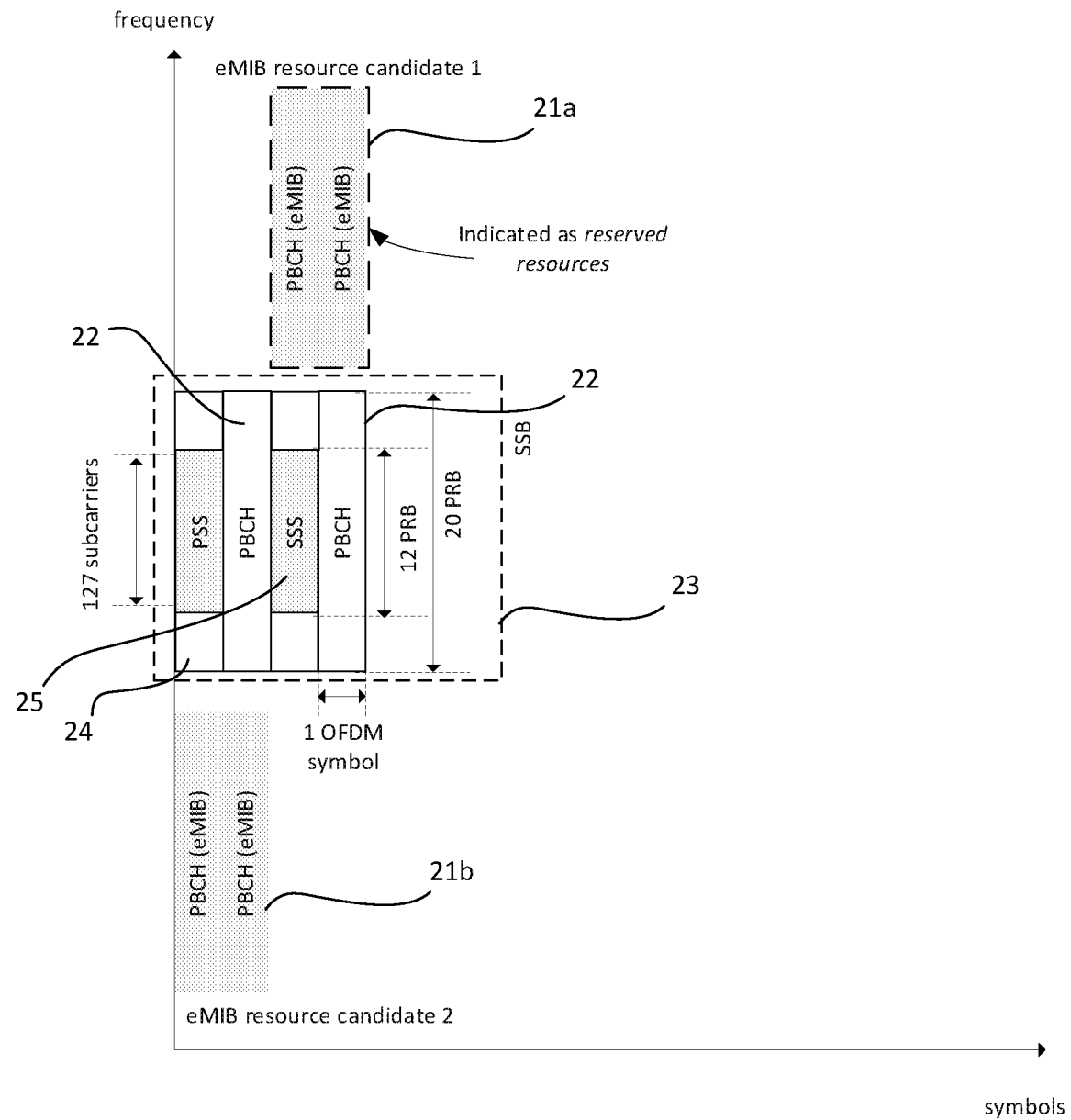
FIG. 6 is a schematic illustration of frequency domain and time domain allocations of two eMIB candidate resources in reference to an SSB block in accordance with some embodiments.

Turning briefly to FIG. 6, where the frequency domain and time domain allocations of a pair of eMIB candidate resources 21a, 21b in relation to the Physical Broadcast Channel (PBCH) 22 in a Synchronization Signal Block (SSB) 23. It should be noted that even though two candidate resources 21a, 21b are indicated in FIG. 6, a configuration having a higher number of candidate resources are possible. The time and frequency resource allocation of the candidate resources 21a, 21b relative to PBCH as well as the number of candidates may be configured in specification (i.e. hard coded).

```
-- ASN1START
-- TAG-MIB-START
MIB ::=                    SEQUENCE {
    systemFrameNumber           BIT STRING (SIZE (6)),
    subCarrierSpacingCommon     ENUMERATED {scs15or60, scs30or120},
    ssb-SubcarrierOffset        INTEGER (0..15),
    dmrs-TypeA-Position         ENUMERATED {pos2, pos3},
    pdcch-ConfigSIB1            PDCCH-ConfigSIB1,
    cellBarred                  ENUMERATED {barred, notBarred},
    intraFreqReselection        ENUMERATED {allowed, notAllowed},
    spare                       BIT STRING (SIZE (1))
}
-- TAG-MIB-STOP
-- ASN1STOP
```

In accordance with some embodiments, the instant disclosure adds functionality to one or more reserved (i.e., "spare") bits such that the one or more reserved bits in the existing wireless communication standards now have function(s) and/or functionality that is described herein such as the functionality with respect to MIB, i.e., the "spare" bits are no longer spare. Also, for clarity, the one or more bits with new functionality described herein are still referred to as one or more "reserved" bits although these one or more bits correspond to one or more previously reserved bits as these previously reserved bits now have new functionality described herein.

Figure 2:
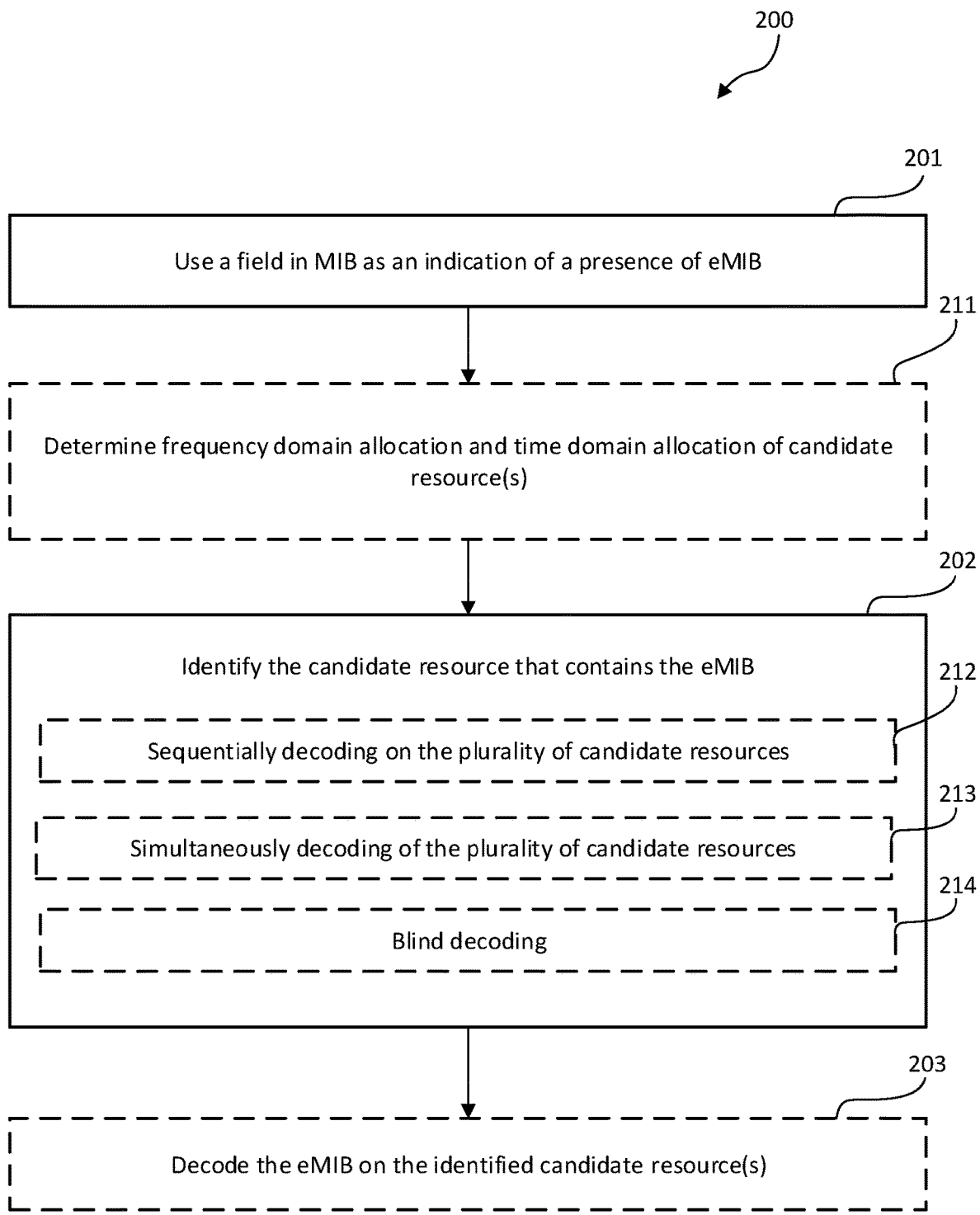
FIG. 2 is a schematic flow chart representation of a method performed by a wireless device for communication with a network node in a wireless communication network in accordance with some embodiments.

FIG. 2 is a schematic flow chart representation of a method 200 performed by a WD for communicating with a network node in a wireless communication network in accordance with an embodiment of the present disclosure. The method 200 comprises, using 201 a field in a Master Information Block (MIB), received by the wireless device, as an indication of a presence of an extended MIB (eMIB). In accordance with some embodiments, the field in the MIB is a reserved bit in the MIB (i.e. a "spare" bit in the MIB as explained in the foregoing). The method 200 may further comprise a step of receiving a MIB transmitted by the network node.

Thus, for a Rel-15 or Rel-16 UE/WD, the bit in the MIB is reserved, and the UE/WD does not expect any specific Further, the method 200, comprises decoding the eMIB in order to obtain configurations for a set of resources used by a control channel and/or Search Space #0 for a bandwidth-limited wireless device. In other words, the UE/WD attempts to decode the eMIB on the identified candidate resource. In some embodiments, if an eMIB is detected on a candidate resource, the method 200 further comprises stopping the checking of other candidate resources for the eMIB. A bandwidth limited device may also be referred to as an NR-light device, which may be understood as reduced-capability NR devices, i.e. those type of devices have UE capability/complexity trade-off in-between the conventional eMBB services and the low-complexity services enabled NB-IoT and LTE-M.

Moving on, in accordance with some embodiments, the step of identifying 202 which candidate resource of the at least one candidate resource comprises sequentially decoding 212 on a plurality of candidate resources until the candidate resource containing the eMIB is identified. In other words, the UE attempts to decode eMIB on a first candidate resource (e.g. ref. 21a in FIG. 6), and if it fails to decode (e.g., after a number of trials), the UE switches to a second candidate resource (e.g. ref. 21b in FIG. 6) and attempts eMIB decoding there. However, in accordance with some embodiments the step of identifying 202 which candidate resource of the at least one candidate resource comprises simultaneously decoding 213 on a plurality of candidate resources until the candidate resource containing the eMIB is identified. In other words, the UE can attempt to decode eMIBs on several candidate resources at the same time, and attempts to identify 202 which candidate carries the eMIB.

Further, in accordance with some embodiments, the step of identifying 202 which candidate resource of the at least one candidate resource comprises performing blind decoding 214 of the eMIB on the at least one candidate resource in order to identify which candidate resource of the at least one candidate resource contains the eMIB. Blind decoding may be understood as a process of decoding a message on one or more spectrum resources "blindly", i.e. without knowing if it is the right spectrum resource(s), until the expected data or payload is found. According to some embodiments, the method 200 may further comprise: stopping the blind decoding 214 on further candidate resources once the eMIB is detected.

The eMIB may be transmitted periodically by the network node, therefore the UE may also perform coherent or non-coherent combining for eMIBs transmitted in different time locations to decode the eMIB. Thus, to some embodiments, the method 200 further comprises: coherently combining a plurality of eMIBs transmitted in different time and/or frequency locations in order to decode the eMIB or non-coherently combining a plurality of eMIBs transmitted in different time and/or frequency locations in order to decode the eMIB.

In accordance with some embodiments, the frequency-domain and time-domain allocations of each of the plurality of candidate resources may be determined based on the information signaled or contained in MIB. In more detail, one of the information elements in MIB is pdcch-ConfigSIB1 which indicates CORESET #0 and Search Space #0 configurations. The CORESET #0 information indicates the frequency location and bandwidth of CORESET #0 as well as the duration of CORESET #0 (in terms of number of OFDM symbols). To be more specific, in clause 13 of TS 38.213 it is stated that "The UE determines a number of consecutive resource blocks and a number of consecutive symbols for the CORESET of the Type0-PDCCH CSS set from controlResourceSetZero in pdcch-ConfigSIB1, as described in Tables 13-1 through 13-10, and determines PDCCH monitoring occasions from searchSpaceZero in pdcch-ConfigSIB1, included in MIB.

Once the UE has acquired the frequency location and bandwidth of CORESET #0, then, according to some embodiments, each eMIB candidate resource is configured with a frequency allocation within (smaller or equal to) the frequency span configured for CORESET #0. This may ensure that each of the candidate resources will be within (smaller or equal to) the carrier bandwidth, and in fact within the initial bandwidth part bandwidth. Thus, in accordance with some embodiments, the method 200 further comprises determining 211 a frequency domain allocation and a time domain allocation of each of the at least one candidate resource based on information obtained from the MIB.

Further, in accordance with some embodiments, the method 200 further comprises determining a frequency allocation and a bandwidth of a set of resources used by a control channel based on information obtained from the MIB. The set of resources used by the control channel may be Control Resource Set number 0, CORESET #0. Further, the method 200 may comprise determining a set of OFDM symbols allocated for monitoring Physical Downlink Control Channel, PDCCH, resource elements in Search Space #0 associated with the set of resources used by the control channel based on the information obtained from the MIB.

In some embodiments, the frequency domain allocation of each of the at least one candidate resource is at a frequency band within of the frequency allocation and the bandwidth of the set of resources used by the control channel, and the time domain allocation of each of at least one candidate resource is non-overlapping with OFDM symbols allocated for monitoring PDCCH resource elements in Search Space #0 associated with the set of resources used by the control channel.

In other words, the time-domain allocation of an eMIB candidate resource may in some embodiments be non-overlapping with the OFDM symbols allocated for monitoring PDCCH candidates in Search Space #0 associated with CORESET #0. That is, the eMIB assumes the same frequency allocation (or a subset thereof) as CORESET #0, but the symbols used are different than the symbols allocated for monitoring PDCCH candidates in Search Space #0 associated with CORESET #0. The symbols assumed for eMIB can be defined relative to the symbols used for the symbols allocated for monitoring PDCCH candidates in Search Space #0 associated with CORESET #0. Alternatively, a new set of symbols may be defined for eMIB.

Further, in accordance with some embodiments, the frequency domain allocation of each of the at least one candidate resource is at a frequency band outside of the frequency allocation and the bandwidth of the set of resources used by the control channel, and the time domain allocation of each of at least one candidate resource is at least partly overlapping with the set of OFDM symbols allocated for monitoring PDCCH resource elements in Search Space #0 associated with the set of resources used by the control channel.

In other words, the time-domain allocation of an eMIB candidate resource may in some embodiments be at least partly overlapping with the OFDM symbols allocated for monitoring PDCCH candidates in Search Space #0 associated with CORESET #0. That is, the eMIB assumes the a different frequency allocation as compared to CORESET #0, but one or more symbols used may be the same as the symbols allocated for monitoring PDCCH candidates in Search Space #0 associated with CORESET #0.

Further, in accordance with some embodiments, each of the at least one candidate resource has a frequency allocation that is non-overlapping with a frequency allocation of any Synchronization Signal Block, SSB, resources, and each of the at least one candidate resource has a time domain allocation overlapping with a set of OFDM symbols used for the SSB resources.

In other words, in some embodiments, the time-domain allocation of each eMIB candidate resource overlaps with the OFDM symbols used for SSB transmissions while the frequency-domain allocation does not overlap with the frequency domain allocation used for SSB transmissions. Reverting to FIG. 6, the SSB 23, comprising a set of SSB resources in the form of Primary Synchronization Signal (PSS) 24, PBCH 22, and Secondary Synchronization Signal (SSS) 25 uses the first four OFDM symbols. Accordingly, the first eMIB resource candidate 21a uses the 3rd and 4th OFDM symbols which overlap with SSS and PBCH, whereas the second eMIB resource candidate 21b uses the 1st and 2nd OFDM symbols which overlap with PSS and PBCH. In this example, each of the eMIB resource candidates does not overlap in the frequency domain with the SSB resources. Moreover, it may be advantageous to be able to transmit the eMIB during OFDM symbols in which a part of the SSB is transmitted as the same beamforming weight can be applied to transmit SSB and eMIB simultaneously. Thus, in accordance with some embodiments, the method 200 comprises using the same beamforming weight in order to receive the eMIB on the at least one candidate resource simultaneously with the SSB transmission.

However, in some embodiments, each of the at least one candidate resource has a frequency allocation that is at least partly overlapping with a frequency allocation of any Synchronization Signal Block (SSB) resources, wherein each of the at least one candidate resource has a time domain allocation that is non-overlapping with a set of OFDM symbols used for the SSB resources.

Further, in accordance with some embodiments, the time-domain allocation of an eMIB candidate is determined from the time allocation and periodicity of SSB. In more detail, the eMIB may be transmitted with a periodicity which is equal to SSB-periodicity/N, where N is a positive integer, and with a configurable time offset. For example, eMIB could then be transmitted every 4th time SSB is transmitted and 20 ms later than SSB.

Further, the monitoring occasions for eMIB may be derived from the monitoring occasions for Type0-PDCCH CSS, i.e., from searchSpaceZero signaled in MIB. In some embodiments, eMIB monitoring occasions are the same as the monitoring occasions of Type0-PDCCH CSS, or a subset of the eMIB monitoring occasions are the same as the monitoring occasions of Type0-PDCCH CSS, or the eMIB monitoring occasions are defined relative to the monitoring occasions of Type0-PDCCH CSS, or eMIB monitoring occasions are defined relative to a subset of the monitoring occasions of Type0-PDCCH CSS.

Accordingly, in accordance with some embodiments, the method 200 comprises determining monitoring occasions of a Physical Downlink Control Channel (PDCCH) based on information contained in the MIB, determining monitoring occasions of the eMIB on the at least one candidate resource based on the determined monitoring occasions of the PDCCH.

Further, in accordance with some embodiments, the one or more eMIB candidate resources are indicated as reserved resource to all the UEs, including legacy Rel-15/16 UEs as well as new Rel-17 UEs. This allows a UE to have PDSCH rate-matched around eMIB resources when the scheduled PDSCH has resources overlapping with any of the resource elements allocated to eMIB transmissions. There is an established mechanism for a legacy NR UE to rate-match around the reserved resources. Reverting to FIG. 6, the first candidate resource 21 is the one that is used for eMIB transmissions. The resource elements of the first candidate resource 21a are therefore indicated as reserved resources.

Still further, in accordance with some embodiments, the method 200 further comprises providing user data, and forwarding the user data to a host computer via the transmission to the network node/base station.

Figure 3:
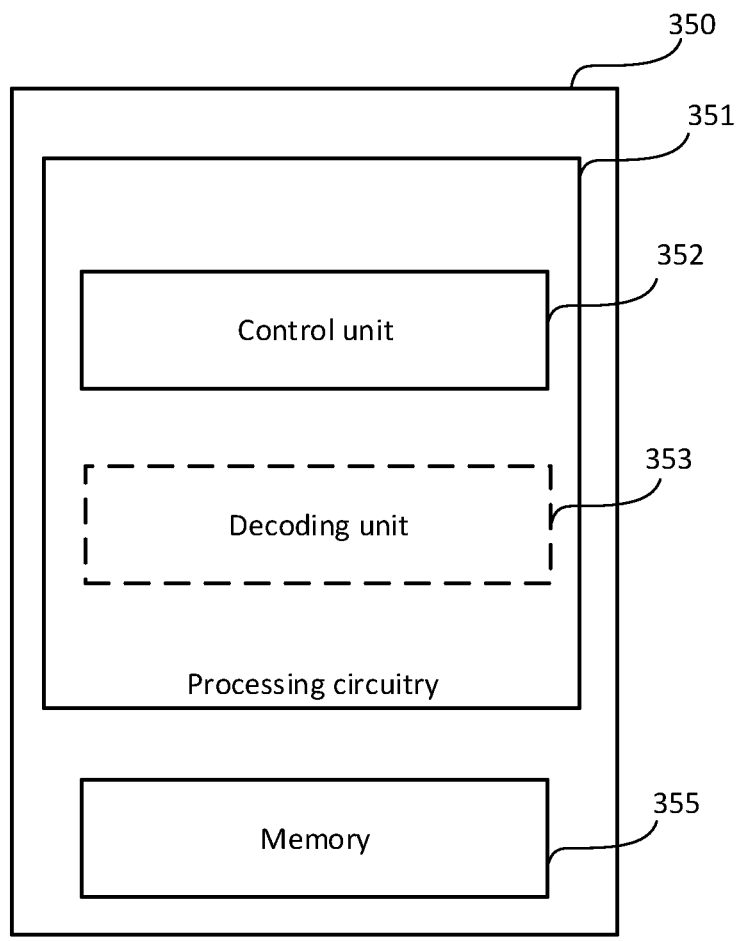
FIG. 3 is a schematic block diagram representation of a wireless device for communication with a network node in a wireless communication network in accordance with some embodiments.
Figure 4:
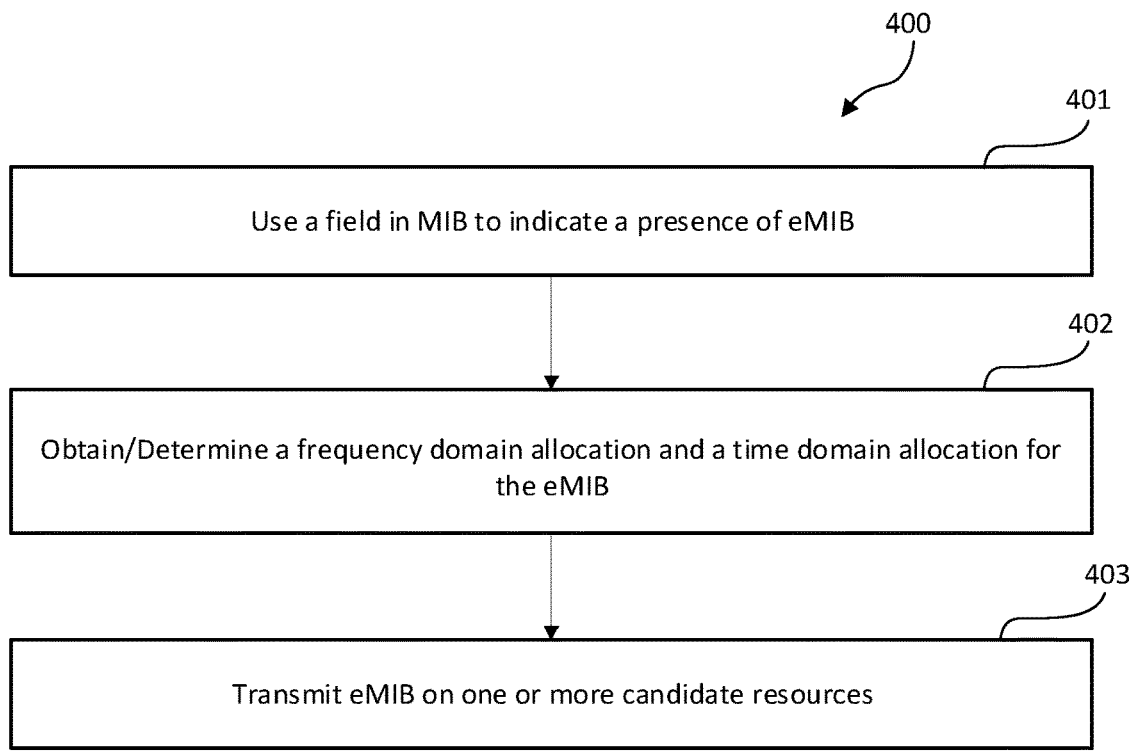
FIG. 4 is a schematic flow chart representation of a method performed by a network node for handling communication of wireless devices in a wireless communication network in accordance with some embodiments.

FIG. 3 is a schematic block diagram representation of embodiments of an apparatus 350 in a wireless communication network 100 (for example, the wireless network shown in FIG. 1). The apparatus 550 may be implemented in a wireless device (e.g. the wireless device 121 shown in FIG. 1). The apparatus 350 is operable to carry out the example methods described with reference to FIG. 2, and possibly any other processes or methods disclosed herein. In more detail, the apparatus 350 is operable to execute the methods described herein to obtain configurations of CORE-SET #0 and/or Search Space #0 for bandwidth-limited NR devices. It is also to be understood that the method of FIG. 4 is not necessarily carried out solely by apparatus 350. At least some operations of the method can be performed by one or more other entities. At least some operations of the method could be performed by one or more other entities.

Apparatus 350, also referred to as a virtual apparatus implemented in a wireless device (WD) or user equipment (UE), may comprise processing circuitry 351, which may include one or more microprocessor or microcontrollers, as well as other digital hardware, which may include digital signal processors (DSPs), special-purpose digital logic, and the like. The processing circuitry 351 may be configured to execute program code stored in memory 355, which may include one or several types of memory 355 such as read-only memory (ROM), random-access memory, cache memory, flash memory devices, optical storage devices, etc. Program code stored in memory 355 includes program instructions for executing one or more telecommunications and/or data communications protocols as well as instructions for carrying out one or more of the techniques described herein, in several embodiments. In some implementations, the processing circuitry 351 may be used to cause a control unit 352, a decoding unit 353, and any other suitable units of apparatus 350 to perform corresponding functions according one or more embodiments of the present disclosure.

The wireless device 350 or processing circuitry 351 therein is configured to, or may comprise a control unit 352 configured to, use a field in a MIB, received by the wireless device, as an indication of a presence of an extended MIB (eMIB). The wireless device 350 or processing circuitry 351 therein is further configured to, or the control unit 352 is further configured to, identify which candidate resource of the at least one candidate resource that contains the eMIB based on the indication of the presence of the eMIB.

The wireless device 350 may further comprise an antenna configured to send and receive wireless signals, radio front-end circuitry connected to the antenna and to processing circuitry, and configured to condition signals communicated between the antenna and the processing circuitry 351. The wireless device may further comprise an input interface connected to the processing circuitry 351 and configured to allow input of information into the UE to be processed by the processing circuitry 351, and an output interface connected to the processing circuitry and configured to output information from the UE that has been processed by the processing circuitry. Moreover, the wireless device may comprise a battery connected to the processing circuitry 351 and configured to supply power to the UE.

Moving on, example embodiments of a method 400 performed by a network node for handling communication of wireless devices in a wireless communication network will now be described with reference to the schematic flowchart illustrated in FIG. 4. Accordingly, FIG. 6 is an illustrated example of actions or operations, which may be taken or performed by the network node 110 in the wireless communication network 100 as described and shown in FIG. 1. The method 600 comprises using 401 a field in a MIB to be transmitted to the wireless device as an indication of a presence of an eMIB. The field in the eMIB may for example be the reserved ("spare") bit in the MIB, and the presence of the eMIB is indicated by a value of the reserved bit being set to 1. Thus, in accordance with some embodiments, the method 400 further comprises indicating each of the at least one candidate resource as a reserved resource to the WD.

The method 400 further comprises obtaining/determining 402 at least one of a frequency domain allocation and a time domain allocation for the eMIB, and transmitting 403 the eMIB on at least one candidate resource to the wireless device in accordance with the determined frequency domain allocation and/or the determined time domain allocation. In accordance with some embodiments, the eMIB is transmitted 403 periodically.

Further, in accordance with some embodiments, the frequency domain allocation is defined in relation to the frequency domain allocation of the Physical Broadcast Channel, PBCH. Similarly, in accordance with some embodiments, the time domain allocation is defined in relation to the time domain allocation of the PBCH. Moreover, the frequency domain allocation and/or time domain allocation for the eMIB may be defined based on information contained in the MIB.

Moreover, in some embodiments, the time domain allocation is determined based on transmitting/monitoring occasions of a Physical Downlink Control Channel (PDCCH) as defined in the MIB.

Still further, in accordance with some embodiments, the frequency domain allocation of the eMIB is defined based on a frequency allocation and a bandwidth of a set of resources used by a control channel (e.g. CORESET #0) as defined in the MIB. Moreover, the time domain allocation of the eMIB is defined based on the OFDM symbols allocated for monitoring PDCCH resource elements in Search Space #0 associated with the set of resources used by the control channel as defined in the MIB. Thus, the transmitting 403 of the eMIB is done on at least one candidate resource at a frequency band within the frequency allocation and the bandwidth of set of resources used by the control channel (e.g. CORESET #0), while using different OFDM symbols then the OFDM symbols allocated for transmitting PDCCH resource elements in Search Space #0 associated with the set of resources used by the control channel.

However, in accordance with some embodiments, the transmitting of the eMIB is done on at least one candidate resource at a frequency band outside of the frequency allocation and the bandwidth of set of resources used by the control channel, while using one or more overlapping OFDM symbols allocated for transmitting PDCCH resource elements in Search Space #0 associated with the set of resources used by the control channel.

Moving on, in accordance with some embodiments, the frequency domain allocation for the eMIB is defined so to be at least partly overlapping with a frequency domain allocation of SSB transmissions, and the time domain allocation for the eMIB is defined so to be non-overlapping with OFDM symbols used for the SSB transmissions.

Figure 7A:
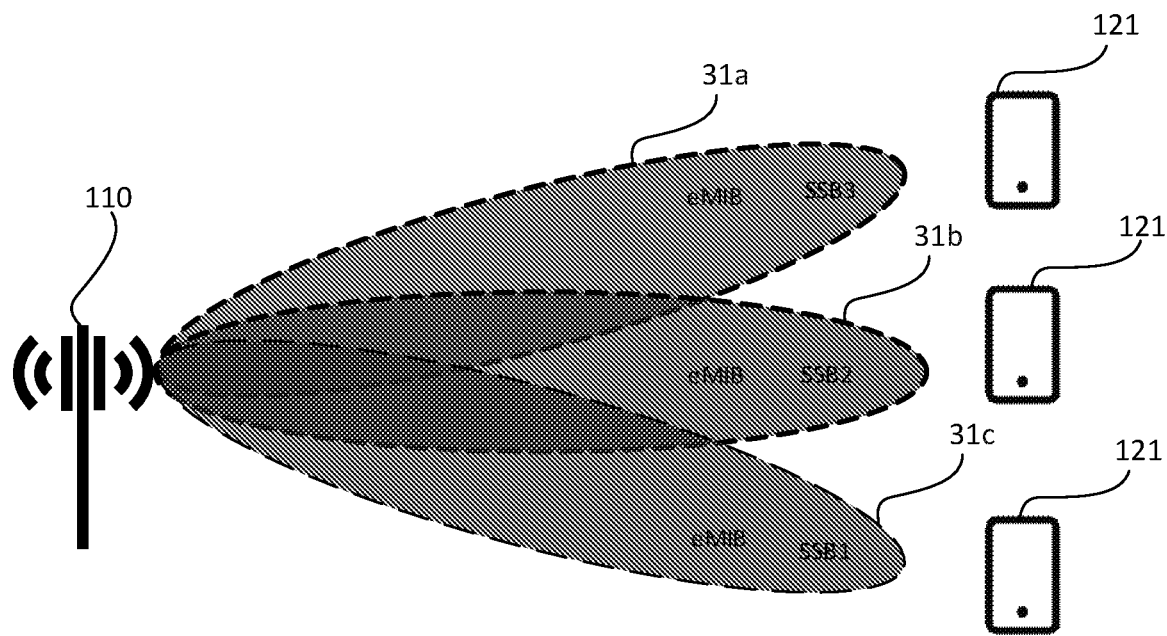
FIG. 7a is a schematic illustration of eMIB transmissions in reference to a set of SSB beams in accordance with some embodiments.
Figure 7B:
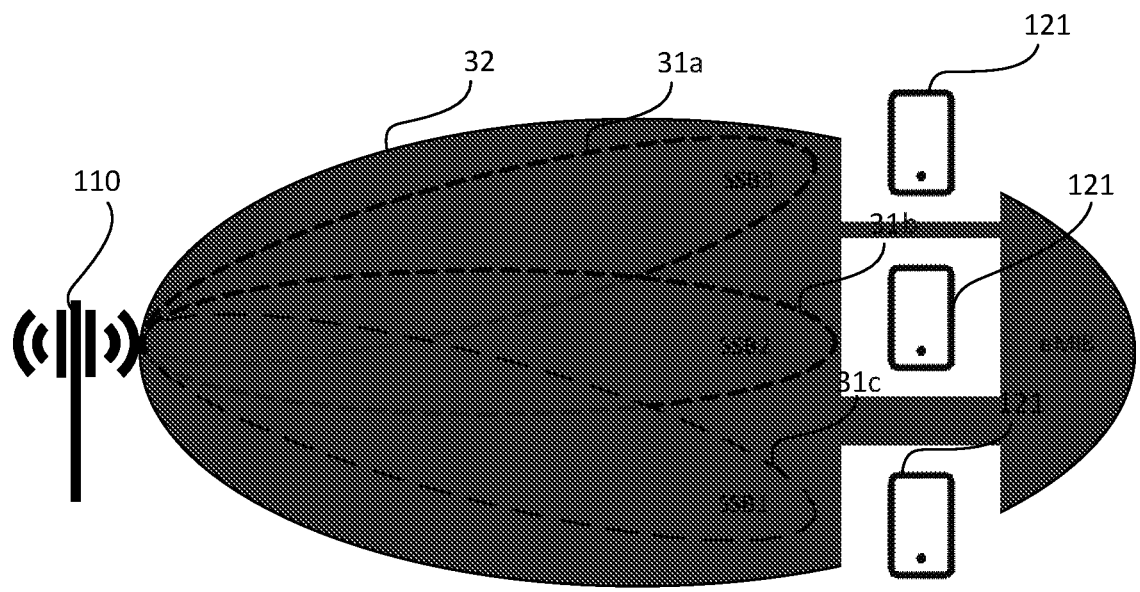
FIG. 7b is a schematic illustration of an eMIB transmission in reference to a set of SSB beams in accordance with some embodiments.

However, in some embodiments, the frequency domain allocation for the eMIB is defined so to be non-overlapping with a frequency domain allocation of SSB transmissions, and the time domain allocation for the eMIB is defined so to be at least partly overlapping with OFDM symbols used for the SSB transmissions. As mentioned, it may be advantageous to be able to transmit eMIB during OFDM symbols in which a part of the SSB is transmitted as the same beamforming weight can be applied to transmit SSB and eMIB simultaneously. Thus, in accordance with some embodiments, an eMIB is transmitted in each of the SSB beams 31a-31c, as illustrated in FIG. 7a. Accordingly, in some embodiments, the method 400 further comprises transmitting a plurality of SSB beams 31a-31c, and wherein the step of transmitting 403 the eMIB on at least one candidate resource comprises transmitting 403 the eMIB on the at least one candidate resource in each of the plurality of SSB beams 31a-31c.

In some embodiments, a number of SSB beams 31a-31c can share the same eMIB transmission 32, as illustrated in FIG. 8b. In such embodiments, each of these SSB beam 31a-31c has a configuration where a reserved bit in the MIB is set to 1 in order to indicate there is an eMIB transmission 32. The time-domain allocation of an eMIB candidate resource in such embodiments may be relative to a system frame number, subframe number, slot number, and/or half-slot index. Moreover, a different beamforming pattern is used for transmitting 403 the eMIB to ensure that the coverage of eMIB can encompass the coverage areas of each of the three SSB beams 31a-31c. Accordingly, in some embodiments, the method 400 comprises transmitting a plurality of SSB beams, and wherein the step of transmitting 403 the eMIB on at least one candidate resource comprises transmitting 403 the eMIB on the at least one candidate resource using a beamforming pattern having a coverage encompassing a coverage area of the plurality of SSB beams.

Further, in accordance with some embodiments, the time domain allocation for the eMIB is defined based on a time allocation and periodicity of the SSB transmission. Moreover, the time domain allocation for the eMIB may be defined to be equal to the periodicity of the SSB transmission divided by N, where N is a positive integer. Furthermore, the time domain allocation for the eMIB may be defined to have a time offset relative to the SSB transmission.

In accordance with some embodiments, the method 400 further comprises obtaining user data, and forwarding the user data to a host computer or a wireless device.

Figure 5:
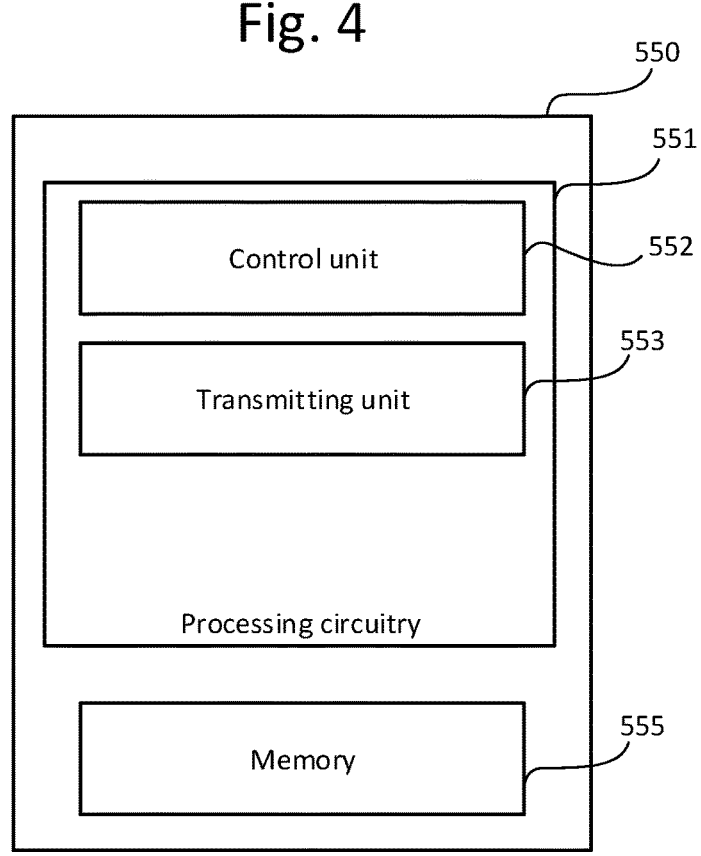
FIG. 5 is a schematic block diagram representation of a network node for handling communication of wireless devices in a wireless communication network in accordance with some embodiments.

FIG. 5 is a schematic block diagram representation of embodiments of an apparatus 550 in a wireless communication network 100. The apparatus 550 may be implemented in a base station or network node (e.g. the network node 110 shown in FIG. 1). The apparatus is operable to carry out the example methods described with reference to FIG. 5, and possibly any other processes or methods disclosed herein. In more detail, the apparatus 550 is suitable for signaling configurations of CORESET #0 and/or Search Space #0 for bandwidth-limited NR devices in accordance with some embodiments disclosed herein. It is also to be understood that the method of FIG. 5 is not necessarily carried out solely by apparatus 550. At least some operations of the method can be performed by one or more other entities. At least some operations of the method could be performed by one or more other entities.

Apparatus 550, also referred to as a virtual apparatus implemented in a base station, may comprise processing circuitry 551, which may include one or more microprocessor or microcontrollers, as well as other digital hardware, which may include digital signal processors (DSPs), special-purpose digital logic, and the like. The processing circuitry 551 may be configured to execute program code stored in memory 555, which may include one or several types of memory 555 such as read-only memory (ROM), random-access memory, cache memory, flash memory devices, optical storage devices, etc. Program code stored in memory 555 includes program instructions for executing one or more telecommunications and/or data communications protocols as well as instructions for carrying out one or more of the techniques described herein, in several embodiments. In some implementations, the processing circuitry may be used to cause a control unit 552, a transmitting unit 553, and any other suitable units of apparatus 550 to perform corresponding functions according one or more embodiments of the present disclosure.

The network node or processing circuitry 551 therein may be configured to, or may comprise the control unit 552 configured to use a field in a MIB to be transmitted to the wireless device as an indication of a presence of an eMIB. The network node or processing circuitry 551 therein may be configured to, or may comprise the control unit 552 configured to obtain at least one of a frequency domain allocation and a time domain allocation for the eMIB. The network node or processing circuitry 551 therein may be further configured to, or may comprise the transmitting unit 553 configured to, transmit the eMIB on at least one candidate resource to the wireless device in accordance with the determined frequency domain allocation and/or the determined time domain allocation.

Figure 8:
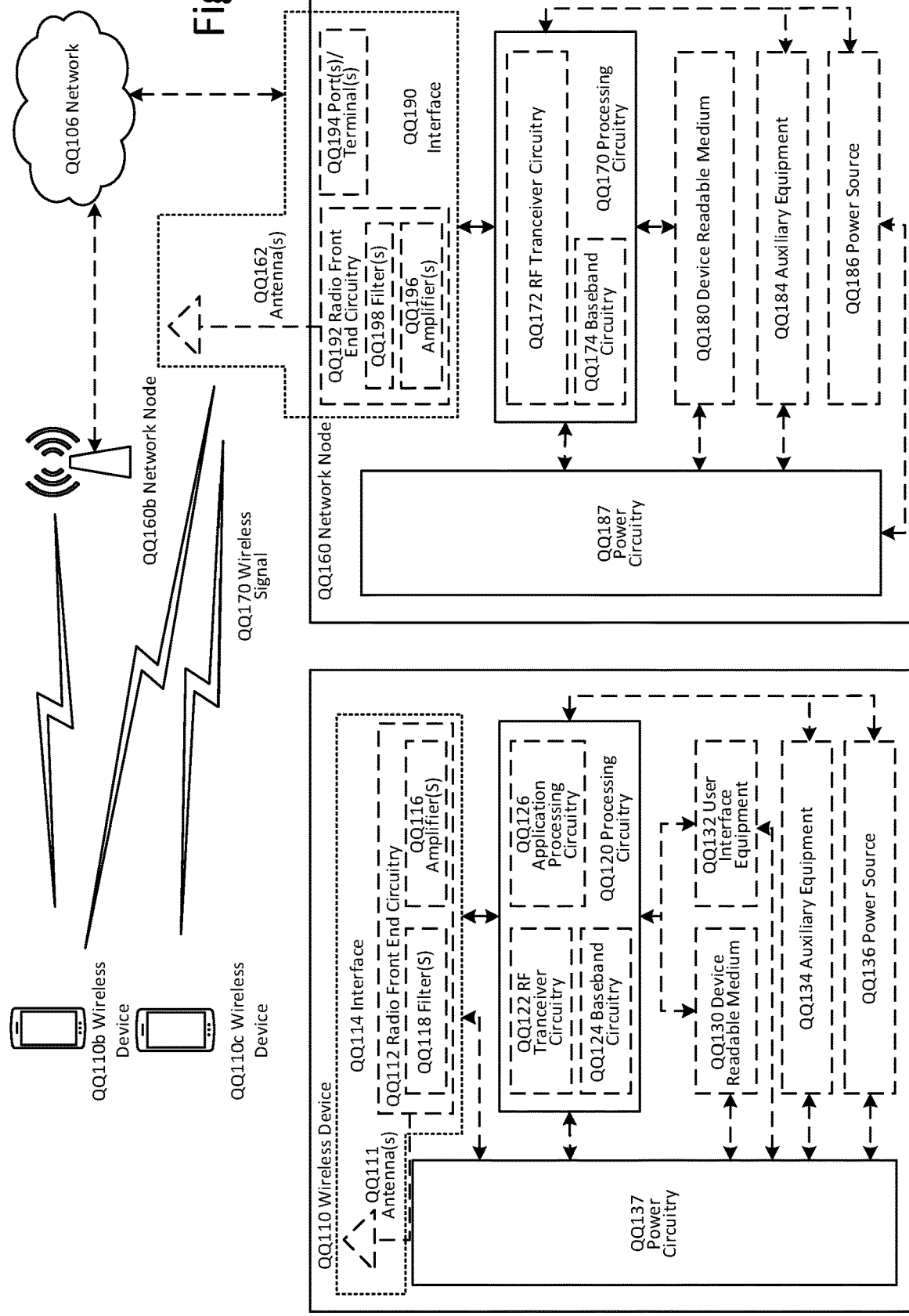
FIG. 8 is a schematic illustration of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units. In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
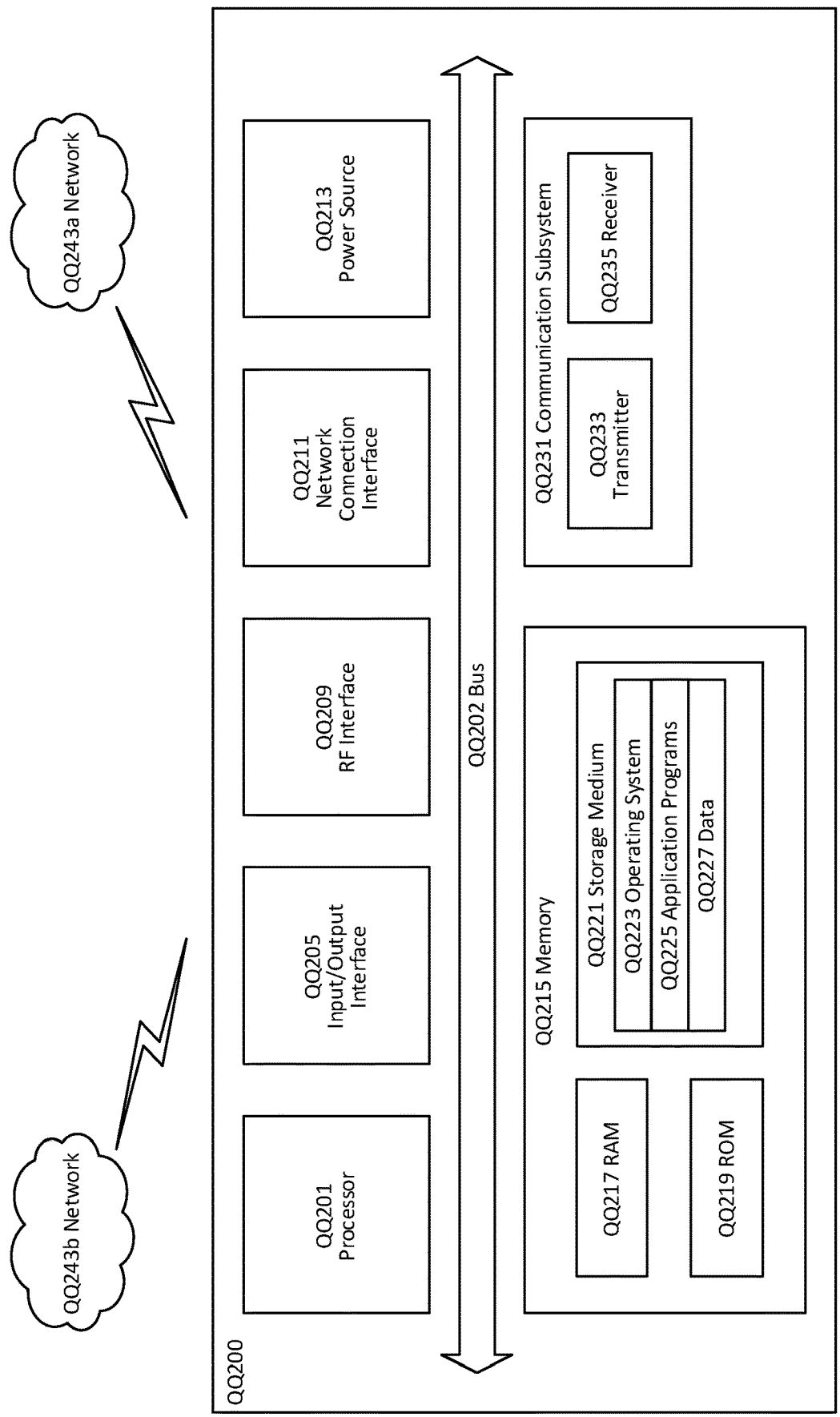
FIG. 9 is a schematic illustration of a user equipment.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
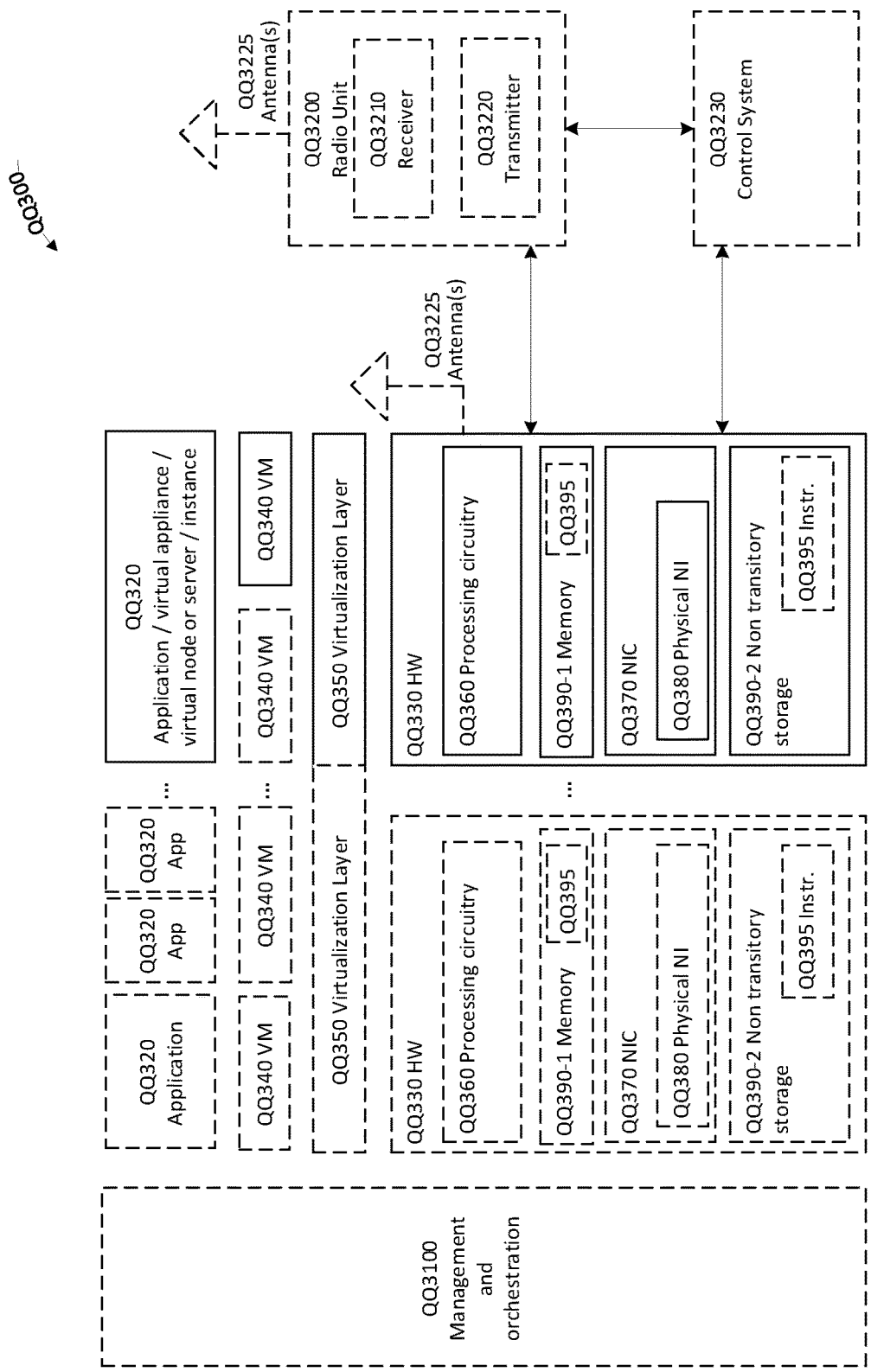
FIG. 10 is a schematic illustration of a virtualization environment in accordance with some embodiments.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in Figure QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 11:
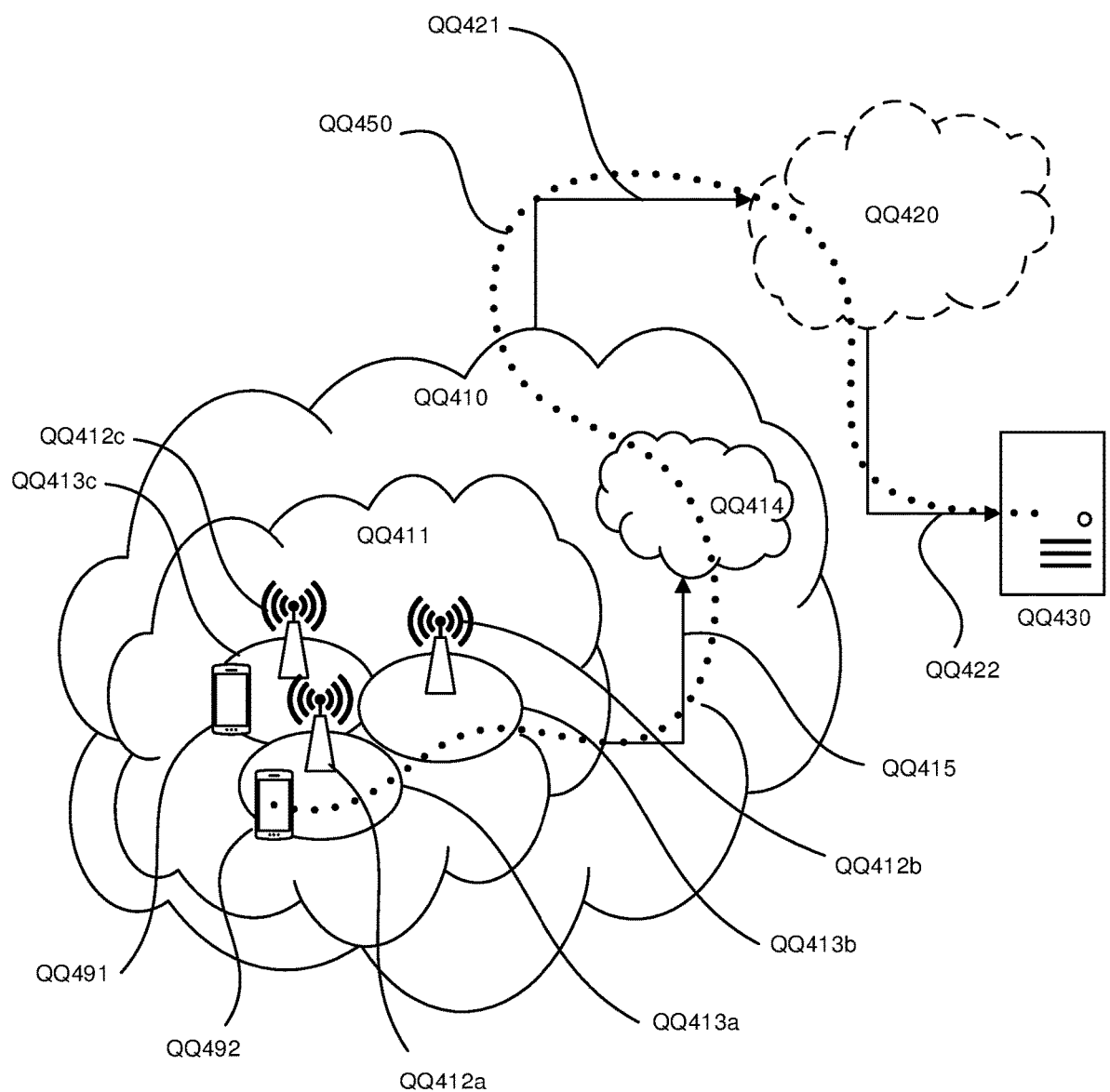
FIG. 11 schematically illustrates a telecommunication network connected via an intermediate network to a host computer.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 12:
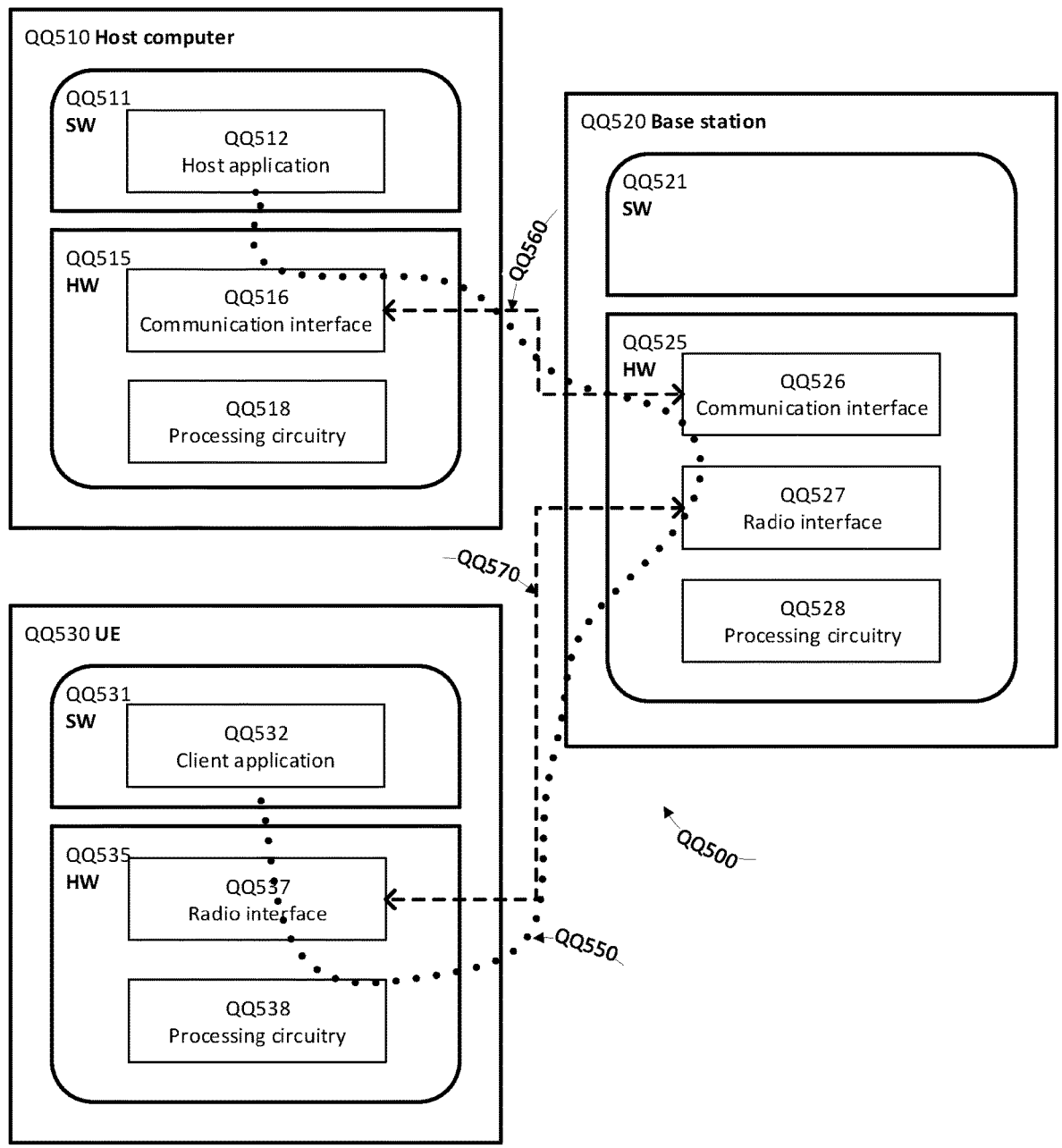
FIG. 12 is a generalized block diagram of a host computer communicating via a base station with a user equipment over a partially wireless connection.

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, 00492 of FIG. 11, respectively. This is to say, the inner workings of these entities may be as shown in FIG. 12 and independently, the surrounding network topology may be that of FIG. 11.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate and latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 13, 14:
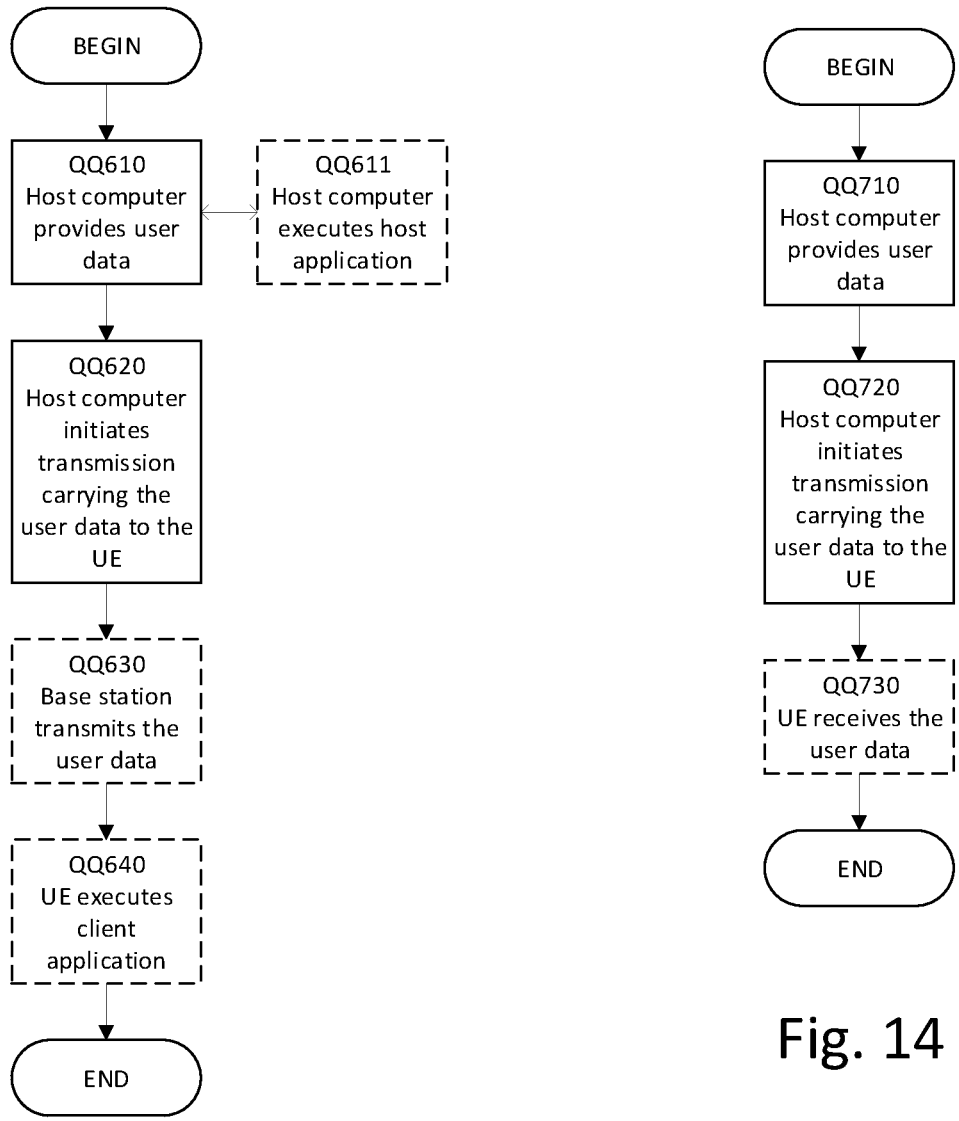
FIGS. 13-16 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 13 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 14 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 15, 16:
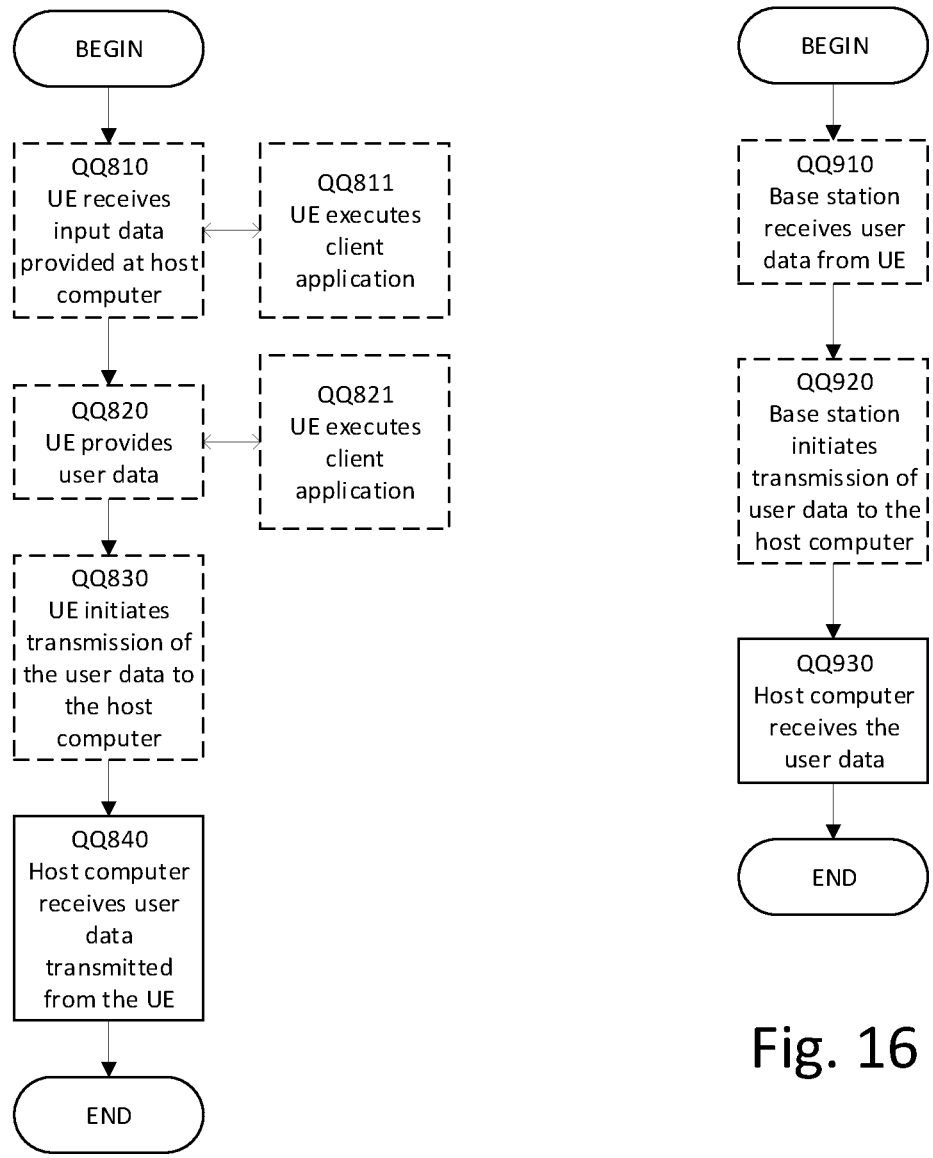

FIG. 15 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 15 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 10. For simplicity of the present disclosure, only drawing references to FIG. 16 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

| Abbreviation | Explanation |
| --- | --- |
| 3GPP | 3rd Generation Partnership Project |
| BCCH | Broadcast Control Channel |
| BCH | Broadcast Channel |
| CDRX | Connected mode DRX (i.e. DRX in RRC_CONNECTED state) |
| CORESET | Control Resource Set |
| CRS | Cell-specific Reference Signal |
| CSI | Channel State Information |
| CSI-RS | Channel State Information Reference Signal |
| DCI | Downlink Control Information |
| DCCH | Dedicated Control Channel |
| DL | Downlink |
| DMRS | Demodulation Reference Signal |
| DRX | Discontinuous Reception |
| eNB | Evolved Node B |
| gNB | A radio base station in 5G/NR |
| IoT | Internet of Things |
| LTE | Long-Term Evolution |
| LTE-M | Long-Term Evolution for Machine-Type Communications |
| LTE-MTC | Long-Term Evolution for Machine-Type Communications |
| MIB | Master Information Block |
| NB-IoT | Narrowband Internet of Things |
| NR | New Radio |
| NRS | Narrowband Reference Signal |
| NSSS | Narrowband Secondary Synchronization Signal |
| NW | Network |
| OFDM | Orthogonal Frequency Division Multiplexing |
| PBCH | Physical Broadcast Channel |
| PCell | Primary Cell |
| PDCCH | Physical Downlink Control Channel |
| PDSCH | Physical Downlink Shared Channel |
| PRB | Physical Resource Block |
| PSS | Primary Synchronization Signal |
| PUCCH | Physical Uplink Control Channel |
| PUSCH | Physical Uplink Shared Channel |
| RNC | Radio Network Controller |
| RRC | Radio Resource Control |
| SCell | Secondary Cell |
| SSB | Synchronization Signal Block |
| SSS | Secondary Synchronization Signal |
| TDD | Time Division Duplex |

| Abbreviation | Explanation |
|---|---|
| TRS | Tracking Reference Signal |
| UE | User Equipment |
| UL | Uplink |
| WD | Wireless Device |

The invention claimed is:

1. A method performed by a wireless device for communicating with a network node in a wireless communication network, the method comprising:
 using a field in a Master Information Block (MIB) received by the wireless device, as an indication of a presence of an extended MIB (eMIB); and
 identifying which candidate resource of at least one candidate resource that contains the eMIB based on the indication of the presence of the eMIB, the identified candidate resource having a frequency domain allocation and a time domain allocation, such that one of:
  the time domain allocation does not overlap a set of orthogonal frequency division multiplex (OFDM) symbols used for synchronization signal block (SSB) resources and the frequency domain allocation at least partially overlaps a frequency domain allocation of the SSB resources; and
 the time domain allocation at least partially overlaps the set of OFDM symbols used for SSB resources and the frequency domain allocation does not overlap a frequency domain allocation of the SSB resources.

2. The method according to claim 1, wherein identifying which candidate resource of the at least one candidate resource comprises one of:
 sequentially decoding on a plurality of candidate resources until the candidate resource containing the eMIB is identified; and
 simultaneously decoding on a plurality of candidate resources until the candidate resource containing the eMIB is identified.

3. The method according to claim 1, wherein identifying which candidate resource of the at least one candidate resource comprises:
 performing blind decoding of the eMIB on the at least one candidate resource in order to identify which candidate resource of the at least one candidate resource contains the eMIB.

4. The method according to claim 1, wherein the field comprises a reserved bit in the MIB.

5. The method according to claim 1, further comprising:
 determining a frequency domain allocation and a time domain allocation of each of the at least one candidate resource based on information obtained from the MIB.

6. The method according to claim 5, further comprising:
 determining a frequency domain allocation and a bandwidth allocation of a set of resources used by a control channel based on information obtained from the MIB;
 determining a set of OFDM symbols allocated for monitoring Physical Downlink Control Channel (PDCCH) resource elements in Search Space #0 associated with the set of resources used by the control channel based on the information obtained from the MIB;
 wherein the frequency domain allocation of each of the at least one candidate resource is at a frequency band within of the frequency domain allocation and the bandwidth allocation of the set of resources used by the control channel; and
 wherein the time domain allocation of each of at least one candidate resource is non-overlapping with OFDM symbols allocated for monitoring PDCCH resource elements in Search Space #0 associated with the set of resources used by the control channel.

7. The method according to claim 5, further comprising:
 determining a frequency domain allocation and a bandwidth allocation of a set of resources used by a control channel based on information obtained from the MIB;
 determining a set of OFDM symbols allocated for monitoring Physical Downlink Control Channel (PDCCH) resource elements in Search Space #0 associated with the set of resources used by the control channel based on information obtained from the MIB;
 wherein the frequency domain allocation of each of the at least one candidate resource is at a frequency band outside of the frequency domain allocation and the bandwidth allocation of the set of resources used by the control channel; and
 wherein the time domain allocation of each of at least one candidate resource is at least partly overlapping with the set of OFDM symbols allocated for monitoring PDCCH resource elements in Search Space #0 associated with the set of resources used by the control channel.

8. The method according to claim 6, wherein the set of resources used by the control channel is Control Resource Set number 0, CORESET #0.

9. The method according to claim 1, further comprising:
 decoding the eMIB in order to obtain configurations for a set of resources used by at least one of a control channel and a Search Space #0 for a bandwidth allocation-limited wireless device.

10. A wireless device for communicating with a network node in a wireless communication network, the wireless device comprising:
 processing circuitry configured to:
  use a field in a Master Information Block (MIB) received by the wireless device, as an indication of a presence of an extended MIB (eMIB); and
  identify which candidate resource of at least one candidate resource that contains the eMIB based on the indication of the presence of the eMIB, the identified candidate resource having a frequency domain allocation and a time domain allocation, such that one of:
   the time domain allocation does not overlap a set of orthogonal frequency division multiplex (OFDM) symbols used for synchronization signal block (SSB) resources and the frequency domain allocation at least partially overlaps a frequency domain allocation of the SSB resources; and
   the time domain allocation at least partially overlaps the set of OFDM symbols used for SSB resources and the frequency domain allocation does not overlap a frequency domain allocation of the SSB resources.

11. A method implemented by a network node that is configured to communicate with a wireless device in a wireless communication network, the method comprising:
 using a field in a Master Information Block (MIB) to be transmitted to the wireless device as an indication of a presence of an extended MIB (eMIB);
 obtaining at least one of a frequency domain allocation and a time domain allocation for the eMIB; and
 transmitting the eMIB on at least one candidate resource to the wireless device in accordance with the determined at least one of the frequency domain allocation and the determined time domain allocation, the at least one candidate resource having a frequency domain allocation and a time domain allocation, such that one of:
- the time domain allocation does not overlap a set of orthogonal frequency division multiplex (OFDM) symbols used for synchronization signal block (SSB) resources and the frequency domain allocation at least partially overlaps a frequency domain allocation of the SSB resources; and
- the time domain allocation at least partially overlaps the set of OFDM symbols used for SSB resources and the frequency domain allocation does not overlap a frequency domain allocation of the SSB resources.

12. The method according to claim 11, wherein the eMIB is transmitted periodically.

13. The method according to claim 11, wherein the field in the MIB comprises a reserved bit in the MIB.

14. The method according to claim 11, wherein the frequency domain allocation is defined in relation to the frequency domain allocation of a Physical Broadcast Channel (PBCH).

15. The method according to claim 14, wherein the time domain allocation is defined in relation to the time domain allocation of the PBCH.

16. The method according to claim 11, wherein the at least one of the frequency domain allocation and the time domain allocation for the eMIB is defined based on information contained in the MIB.

17. The method according to claim 11, wherein the frequency domain allocation is defined based on a frequency domain allocation and a bandwidth allocation of a set of resources used by a control channel as defined in the MIB;
wherein the time domain allocation is defined based on the OFDM symbols allocated for monitoring Physical Downlink Control Channel (PDCCH) resource elements in Search Space #0 associated with the set of resources used by the control channel as defined in the MIB;
wherein the transmitting of the eMIB is done on the at least one candidate resource at a frequency band within the frequency domain allocation and the bandwidth allocation of the set of resources used by the control channel; and
wherein the transmitting of the eMIB is done on the at least one candidate resource using different OFDM symbols than the OFDM symbols allocated for transmitting PDCCH resource elements in Search Space #0 associated with the set of resources used by the control channel.

18. A network node configured to communicate with a wireless device in a wireless communication network, the network node comprising processing circuitry configured to:
use a field in a Master Information Block (MIB) to be transmitted to the wireless device as an indication of a presence of an extended (eMIB);
obtain at least one of a frequency domain allocation and a time domain allocation for the eMIB; and
cause transmission of the eMIB on at least one candidate resource to the wireless device in accordance with the determined at least one of the frequency domain allocation and the determined time domain allocation, the at least one candidate resource having a frequency domain allocation and a time domain allocation, such that one of:
- the time domain allocation does not overlap a set of orthogonal frequency division multiplex (OFDM) symbols used for synchronization signal block (SSB) resources and the frequency domain allocation at least partially overlaps a frequency domain allocation of the SSB resources; and
- the time domain allocation at least partially overlaps the set of OFDM symbols used for SSB resources and the frequency domain allocation does not overlap a frequency domain allocation of the SSB resources.

* * * * *